(12) United States Patent
Thakkar et al.

(10) Patent No.: US 7,359,946 B2
(45) Date of Patent: Apr. 15, 2008

(54) SYSTEM AND METHOD FOR AN EVENT PLANNER

(76) Inventors: Atul Thakkar, 11713 Roberts Glen Ct., Potomac, MD (US) 20854; Esmail Sadeghi, 12914 Travilah Rd., Potomac, MD (US) 20854

( * ) Notice: Subject to any disclaimer, the term of this patent is extended or adjusted under 35 U.S.C. 154(b) by 903 days.

(21) Appl. No.: 10/600,837

(22) Filed: Jun. 23, 2003

(65) Prior Publication Data
US 2004/0083118 A1 Apr. 29, 2004

Related U.S. Application Data

(60) Provisional application No. 60/390,797, filed on Jun. 21, 2002.

(51) Int. Cl.
*G06F 15/16* (2006.01)
(52) U.S. Cl. ........................ 709/206; 709/204
(58) Field of Classification Search ............... 709/206, 709/204; 705/8, 9; 707/10
See application file for complete search history.

(56) References Cited

U.S. PATENT DOCUMENTS

| | | | |
|---|---|---|---|
| 5,050,077 A | 9/1991 | Vincent | |
| 5,124,912 A | 6/1992 | Hotaling et al. | |
| 5,197,000 A | 3/1993 | Vincent | |
| 5,729,687 A | 3/1998 | Rothrock et al. | |
| 5,870,744 A | 2/1999 | Sprague | |
| 5,936,625 A * | 8/1999 | Kahl et al. | 715/775 |
| 5,960,406 A * | 9/1999 | Rasansky et al. | 705/9 |
| 5,963,913 A * | 10/1999 | Henneuse et al. | 705/9 |
| 6,016,478 A | 1/2000 | Zhang et al. | |
| 6,047,288 A | 4/2000 | Kurosawa et al. | |
| 6,064,976 A | 5/2000 | Tolopka | |
| 6,144,942 A | 11/2000 | Ruckdashel | |
| 6,278,456 B1 * | 8/2001 | Wang et al. | 715/700 |
| 6,442,693 B1 | 8/2002 | Sandgren et al. | |
| 6,457,045 B1 | 9/2002 | Hanson et al. | |
| 6,487,583 B1 | 11/2002 | Harvey et al. | |
| 6,567,807 B1 * | 5/2003 | Robles et al. | 707/10 |
| 6,687,678 B1 * | 2/2004 | Yorimatsu et al. | 705/8 |
| 6,732,103 B1 * | 5/2004 | Strick et al. | 707/10 |
| 7,082,402 B2 * | 7/2006 | Conmy et al. | 705/8 |
| 7,236,976 B2 * | 6/2007 | Breitenbach et al. | 707/100 |
| 2002/0032592 A1 * | 3/2002 | Krasnick et al. | 705/8 |
| 2002/0194049 A1 * | 12/2002 | Boyd | 705/9 |
| 2003/0144893 A1 * | 7/2003 | Kawabata et al. | 705/8 |
| 2003/0149606 A1 * | 8/2003 | Cragun et al. | 705/8 |
| 2003/0154116 A1 * | 8/2003 | Lofton | 705/8 |
| 2003/0171965 A1 * | 9/2003 | Ratzlaff et al. | 705/8 |
| 2003/0191679 A1 * | 10/2003 | Casati et al. | 705/8 |
| 2003/0212586 A1 * | 11/2003 | Majd et al. | 705/8 |
| 2003/0220823 A1 * | 11/2003 | Sartorius et al. | 705/8 |

* cited by examiner

*Primary Examiner*—Krisna Lim

(57) ABSTRACT

The present invention relates to method and system for implementing a web-based, passive, user-active, event-centric event planner application for a club. The club has a group of members 30 with one or more of the member 30 being an administrator 31. The administrator 31 sets up information about the club, which includes club information, event information including a schedule of events and member attribute. The members 30 view the details of an event and the list of contributing and participating members 30 for the event simultaneously and make their choice of attending, contributing, not contributing. The present invention involves very low administration and does not use the calendars of the member 30 or any electronic forms or any form of invitation to plan the event.

18 Claims, 24 Drawing Sheets

LET'S MEET

A Member of the selected audience, using his/her computer, goes to the web site using the provided URL.

All the Members see the first screen shown below:

*Member Login*

Username: [            ]
Password: [            ]

*All intellectual property rights in this Software are owned by Atul Thakkar and Esmail Sadeghi and are protected by applicable intellectual property laws (including patent, trademark and copyright laws) and international treaty provisions. Atul Thakkar and Esmail Sadeghi retain all rights not expressly granted.*

*(c) 2002-2003, Atul Thakkar and Esmail Sadeghi*

[ I Agree, Login ]   [ I Do Not Agree, Exit ]

[ I Agree, Log Me In As A Guest ]

Figure 10

MEMBER SCREENS

MOONLIGHT PARTY Toastmasters Club welcomes: SARA CRAMER, Member
Club#:1111    Area:11    Division:A    District:11    Attire: BUSINESS CASUAL
Meeting Time: 6:00 PM    EVERY SECOND MONDAY OF THE MONTH
Location: TEST COMPANY 15800 GAITHER DRIVE SUITE 200 GAITHERSBURG, MD 20877

Club Info    Member Profile    Main    Logout

| *Message* |
|---|
| TO JOIN THE CLUB, PLEASE ATTEND ANY MEETING AS A VISITOR. |

| *Scheduled Meetings* | | | |
|---|---|---|---|
| Go To Current & Future Meetings | | | |
| Monday | 10/20/2003 | 6:00 PM | Details |
| Monday | 10/6/2003 | 6:00 PM | Details |
| Monday | 9/15/2003 | 6:00 PM | Details |
| Monday | 9/1/2003 | 6:00 PM | Details |
| Monday | 8/18/2003 | 6:00 PM | Details |
| Monday | 8/4/2003 | 6:00 PM | Details |
| Monday | 7/21/2003 | 6:00 PM | Details |
| Monday | 7/7/2003 | 6:00 PM | Details |
| Monday | 6/16/2003 | 6:00 PM | Details |
| Monday | 6/2/2003 | 6:00 PM | Details |

Figure 11

MOONLIGHT PARTY Toastmasters Club welcomes: SARA CRAMER, Member
Club#:1111   Area:11   Division:A   District:11   Attire: BUSINESS CASUAL
Meeting Time: 6:00 PM   EVERY SECOND MONDAY OF THE MONTH
Location: TEST COMPANY 15800 GAITHER DRIVE SUITE 200 GAITHERSBURG, MD 20877

[Club Info] [Member Profile] [Main] [Logout]

*Meeting Agenda for:*
*6/16/2003 6:00 PM*

Toastmaster for the Evening: SARA CRAMER
Table Topics Master for the Evening: JAYANTHI SUMMERVILLE
General Evaluator for the Evening: MICHAEL COSBY

| Speech | Presenter | Evaluator |
|---|---|---|
| 1 ICEBREAKER SPEECH | MALA SUBU | MICHELLE PANDIT |
| 2 SPEAKING YOUR MIND | ESMAIL SADEGHI | TEJAS PUJARI |
| 3 ICEBREAKER SPEECH | SARA CRAMER | |
| 4 | | |

[Print Agenda]

*Attendance List for:*
*6/16/2003 6:00 PM*

| Member | Email | Attending? Y | N | ? |
|---|---|---|---|---|
| CYNTHIA BROWN | brownc@funmail.com | | | ✓ |
| ESMAIL SADEGHI | esmail@attronica.com | ✓ | | |
| JAYANTHI SUMMERVILLE | | ✓ | | |
| MALA SUBU | malasubuaaaa1234@aaa.com | ✓ | | |
| MICHAEL COSBY | cosbym@funmail.com | ✓ | | |
| MICHELLE PANDIT | panditm@onemail.net | ✓ | | |
| SARA CRAMER | | ✓ | | |
| TEJAS PUJARI | tejas@aaa.com | ✓ | | |
| | Total | 7 | 0 | 1 |

[Print Attendance]
Send Email to all members

Figure 12

*MOONLIGHT PARTY*
*Toastmasters Club*

*Club#: 1111*   *Area: 11*   *Division: A*   *District: 11*

Monday, June 16, 2003
TEST COMPANY - 6:00 PM

[Back]   AGENDA   [Print]

Toastmaster of the Evening: SARA CRAMER

Table Topics Master: JAYANTHI SUMMERVILLE

General Evaluator: MICHAEL COSBY

Speeches:

| Speech | Speaker | Evaluator |
| --- | --- | --- |
| 1. ICEBREAKER SPEECH | MALA SUBU | MICHELLE PANDIT |
| 2. SPEAKING YOUR MIND | ESMAIL SADEGHI | TEJAS PUJARI |
| 3. ICEBREAKER SPEECH | SARA CRAMER | |
| 4. Unassigned | | |

Final remarks by the Toastmaster: SARA CRAMER

Figure 13

MOONLIGHT PARTY Toastmasters Club welcomes: SARA CRAMER, Member
Club#:1111  Area:11  Divisi n:A  District:11  Attire: BUSINESS CASUAL
Meeting Time: 6:00 PM  EVERY SECOND MONDAY OF THE MONTH
Location: TEST COMPANY 15800 GAITHER DRIVE SUITE 200 GAITHERSBURG, MD 20877

Club Info | Member Profile | Main | Logout

*Attendance List for:*
*6/16/2003 6:00 PM*

Back | Print

| Member | Attending? | | |
|---|---|---|---|
|  | Y | N | ? |
| CYNTHIA BROWN |  |  | ✔ |
| ESMAIL SADEGHI | ✔ |  |  |
| JAYANTHI SUMMERVILLE | ✔ |  |  |
| MALA SUBU | ✔ |  |  |
| MICHAEL COSBY | ✔ |  |  |
| MICHELLE PANDIT | ✔ |  |  |
| SARA CRAMER | ✔ |  |  |
| TEJAS PUJARI | ✔ |  |  |
| Total | 7 | 0 | 1 |

Figure 14

DOCKET NO. ATUL0001  Y Toastmasters Club welcomes: SARA CRAMER, Member
Club#:1111    Area:11    Division:A    District:11    Attire: BUSINESS CASUAL
Meeting Time: 6:00 PM    EVERY SECOND MONDAY OF THE MONTH
Location: TEST COMPANY 15800 GAITHER DRIVE SUITE 200 GAITHERSBURG, MD 20877

[Club Info]  [Member Profile]  [Main]  [Logout]

*MOONLIGHT PARTY*
*Toastmasters Club*

*Club#: 1111*    *Area: 11*    *Division: A*    *District: 11*

*Meeting Location:*
*TEST COMPANY*
*15800 GAITHER DRIVE*
*SUITE 200*
*GAITHERSBURG, MD, 20877*

*Meeting Time:*
*6:00 PM*
*EVERY SECOND MONDAY OF THE MONTH*

*Attire: BUSINESS CASUAL*

*TO JOIN THE CLUB, PLEASE ATTEND ANY MEETING AS A VISITOR.*

Figure 15

MOONLIGHT PARTY Toastmasters Club welcomes: SARA CRAMER, Member
Club#:1111    Area:11    Division:A    District:11    Attire: BUSINESS CASUAL
Meeting Time: 6:00 PM    EVERY SECOND MONDAY OF THE MONTH
Location: TEST COMPANY 15800 GAITHER DRIVE SUITE 200 GAITHERSBURG, MD 20877

[Club Info] [Member Profile] [Main] [Logout]

*Profile*

| | | |
|---|---|---|
| Salutation | ▼ | |
| First Name | SARA | Required |
| Middle Initial | | |
| Last Name | CRAMER | Required |
| * Home Phone | 111-555-5555 | One of the Phone Numbers is Required |
| * Work Phone | | |
| * Cell Phone | | |
| Title | | |
| Email | | |
| User Name | USER444 | Required |
| Password | ******** | Required |

[Save]

Figure 16

Club Info

| | | | |
|---|---|---|---|
| Number | 1111 | Name | MOONLIGHT PARTY |
| Area | 11 | Meeting Time | 6:00 PM |
| Division | A | Meeting Frequency | EVERY SECOND MONDAY OF THE MONTH |
| District | 11 | Meeting Location | TEST COMPANY |
| Address | | Meeting Address | 15800 GAITHER DRIVE |
| | | | SUITE 200 |
| City | | Meeting City | GAITHERSBURG |
| State | | Meeting State | MD |
| Zip | | Meeting Zip | 20877 |
| Web Site | | Meeting Attire | BUSINESS CASUAL |
| Message | TO JOIN THE CLUB, PLEASE ATTEND ANY MEETING AS A VISITOR. | | |
| | Field Titles in Red are Required. | | |
| | Save | | |

Figure 17

MOONLIGHT PARTY Toastmasters Club welcomes: ESMAIL SADEGHI, Administrator
Club#:1111   Area:11   Division:A   District:11   Attire: BUSINESS CASUAL
Meeting Time: 6:00 PM    EVERY SECOND MONDAY OF THE MONTH
Location: TEST COMPANY 13800 GAITHER DRIVE  SUITE 200  GAITHERSBURG , MD 20877

[Club Info] [Member Profiles] [Create Schedule] [Edit Schedule] [Main] [Logout]

| *Message* |
|---|
| TO JOIN THE CLUB, PLEASE ATTEND ANY MEETING AS A VISITOR. |

| *Scheduled Meetings* | | | |
|---|---|---|---|
| Go To Current & Future Meetings | | | |
| Monday | 10/20/2003 | 6:00 PM | Details |
| Monday | 10/6/2003 | 6:00 PM | Details |
| Monday | 9/15/2003 | 6:00 PM | Details |
| Monday | 9/1/2003 | 6:00 PM | Details |
| Monday | 8/18/2003 | 6:00 PM | Details |
| Monday | 8/4/2003 | 6:00 PM | Details |
| Monday | 7/21/2003 | 6:00 PM | Details |
| Monday | 7/7/2003 | 6:00 PM | Details |
| Monday | 6/16/2003 | 6:00 PM | Details |
| Monday | 6/2/2003 | 6:00 PM | Details |

Figure 18

MOONLIGHT PARTY Toastmasters Club welcomes: ESMAIL SADEGHI, Administrator
Club#:1111    Area:11    Division:A    District:11    Attire: BUSINESS CASUAL
Meeting Time: 6:00 PM    EVERY SECOND MONDAY OF THE MONTH
Location: TEST COMPANY 15800 GAITHER DRIVE  SUITE 200  GAITHERSBURG, MD 20877

[Club Info] [Member Profiles] [Create Schedule] [Edit Schedule] [Main] [Logout]

Meeting Agenda for:
6/16/2003 6:00 PM

| | | |
|---|---|---|
| SARA CRAMER | Toastmaster for the Evening | |
| JAYANTHI SUMMER | Table Topics Master for the Evening | |
| MICHAEL COSBY | General Evaluator for the Evening | |

| # | Speech | Presenter | Evaluator |
|---|---|---|---|
| 1 | ICEBREAKER SPEECH | MALA SUBU | MICHELLE PANDIT |
| 2 | SPEAKING YOUR MIND | ESMAIL SADEGHI | TEJAS PUJARI |
| 3 | ICEBREAKER SPEECH | SARA CRAMER | |
| 4 | | | |

Comment:

ESMAIL SADEGHI:
◉ Will Attend  ○ Will Not Attend  ○ Is Undecided

[Save] [Print Agenda]

Attendance List for:
6/16/2003 6:00 PM

| Member | Email | Attending? Y | N | ? |
|---|---|---|---|---|
| CYNTHIA BROWN | brownc@funmail.com | | | ✓ |
| ESMAIL SADEGHI | esmail@attronica.com | ✓ | | |
| JAYANTHI SUMMERVILLE | | ✓ | | |
| MALA SUBU | malasubuaaaa1234@aaa.com | ✓ | | |
| MICHAEL COSBY | cosbym@funmail.com | ✓ | | |
| MICHELLE PANDIT | panditm@onemail.net | ✓ | | |
| SARA CRAMER | | ✓ | | |
| TEJAS PUJARI | tejas@aaa.com | ✓ | | |
| | Total | 7 | 0 | 1 |

[Save] [Print Attendance]

Send Email to all members

Figure 19

MOONLIGHT PARTY Toastmasters Club welcomes: ESMAIL SADEGHI, Administrator
Club#:1111    Area:11    Division:A    District:11    Attire: BUSINESS CASUAL
Meeting Time: 6:00 PM    EVERY SECOND MONDAY OF THE MONTH
Location: TEST COMPANY 15800 GAITHER DRIVE SUITE 200 GAITHERSBURG, MD 20877

| Club Info | Member Profiles | Create Schedule | Edit Schedule | Main | Logout |

Club Info

| | | | |
|---|---|---|---|
| Number | 1111 | Name | MOONLIGHT PARTY |
| Area | 11 | Meeting Time | 6:00 PM |
| Division | A | Meeting Frequency | EVERY SECOND MONDAY OF THE MONTH |
| District | 11 | Meeting Location | TEST COMPANY |
| Address | | Meeting Address | 15800 GAITHER DRIVE |
| | | | SUITE 200 |
| City | | Meeting City | GAITHERSBURG |
| State | | Meeting State | MD |
| Zip | | Meeting Zip | 20877 |
| Web Site | | Meeting Attire | BUSINESS CASUAL |
| Message | TO JOIN THE CLUB, PLEASE ATTEND ANY MEETING AS A VISITOR. | | |

Field Titles in Red are Required.

Save

Figure 20

MOONLIGHT PARTY Toastmasters Club welcomes: ESMAIL SADEGHI, Administrator
Club#:1111   Area:11   Division:A   District:11   Attire: BUSINESS CASUAL
Meeting Time: 6:00 PM   EVERY SECOND MONDAY OF THE MONTH
Location: TEST COMPANY 15800 GAITHER DRIVE SUITE 200 GAITHERSBURG, MD 20877

Club Info  Member Profiles  Create Schedule  Edit Schedule  Main  Logout

| Add New Member | |
|---|---|
| Salutation | |
| First Name | Required |
| Initial | |
| Last Name | Required |
| Home Phone | One of the Phone Numbers is Required |
| Work Phone | |
| Cell Phone | |
| Title | |
| Position | MEMBER |
| Email | |
| Send Username & Password To This Member | |
| User Name | Required |
| Password | Required |
| Save | |

| Member Profiles | | |
|---|---|---|
| Member Name | Edit | Cancelled |
| CYNTHIA BROWN | Edit | |
| ESMAIL SADEGHI | Edit | |
| JAYANTHI SUMMERVILLE | Edit | |
| MALA SUBU | Edit | |
| MICHAEL COSBY | Edit | |
| MICHELLE PANDIT | Edit | |
| SARA CRAMER | Edit | |
| TEJAS PUJARI | Edit | |

Figure 21

MOONLIGHT PARTY Toastmasters Club welcomes: ESMAIL SADEGHI, Administrator
Club#:1111    Area:11    Division:A    District:11    Attire: BUSINESS CASUAL
Meeting Time: 6:00 PM    EVERY SECOND MONDAY OF THE MONTH
Location: TEST COMPANY 15800 GAITHER DRIVE  SUITE 200  GAITHERSBURG, MD 20877

[Club Info] [Member Profiles] [Create Schedule] [Edit Schedule] [Main] [Logout]

Edit Member Profile

| | | |
|---:|---|---|
| Salutation | Ms. ▼ | |
| First Name | CYNTHIA | Required |
| Initial | | |
| Last Name | BROWN | Required |
| Home Phone | 555-555-5555 | One of the Phone Numbers is Required |
| Work Phone | | |
| Cell Phone | | |
| Title | ▼ | |
| Position | MEMBER ▼ | |
| Email | BROWNC@FUNMAIL.COM | |
| | Send Username & Password To This Member | |
| User Name | USER222 | Required |
| Password | ************ | Required |
| Cancel | ☐ | |

[Save]

Figure 22

MOONLIGHT PARTY Toastmasters Club welcomes: ESMAIL SADEGHI, Administrator
Club#:1111   Area:11   Division:A   District:11   Attire: BUSINESS CASUAL
Meeting Time: 6:00 PM   EVERY SECOND MONDAY OF THE MONTH
Location: TEST COMPANY 15800 GAITHER DRIVE SUITE 200 GAITHERSBURG, MD 20877

Club Info | Member Profiles | Create Schedule | Edit Schedule | Main | Logout

Schedule Meeting Times

From: [  ]   To: [  ]   Start Time: [  ]

○ Weekly:  ☐ Sun  ☐ Mon  ☐ Tue  ☐ Wed  ☐ Thu  ☐ Fri  ☐ Sat

○ Monthly Option 1:   The [  ] [  ] of every month
                      The [  ] [  ] of every month
                      The [  ] [  ] of every month ○ Monthly Option 2:   Day [  ] of every month
                      Day [  ] of every month
                      Day [  ] of every month

SAVE

Figure 23

MOONLIGHT PARTY Toastmasters Club welcomes: ESMAIL SADEGHI, Administrator
Club#:1111    Area:11    Division:A    District:11    Attire: BUSINESS CASUAL
Meeting Time: 6:00 PM    EVERY SECOND MONDAY OF THE MONTH
Location: TEST COMPANY 15800 GAITHER DRIVE SUITE 200 GAITHERSBURG, MD 20877

[Club Info] [Member Profiles] [Create Schedule] [Edit Schedule] [Main] [Logout]

Edit Schedule Detail

[Save]

| Date | Day | Time | Cancel | Cancel Date | Speech Scheduled? |
|---|---|---|---|---|---|
| 10/20/2003 | Monday | 6:00:00 PM | ☐ | | |
| 10/6/2003 | Monday | 6:00:00 PM | ☐ | | |
| 9/15/2003 | Monday | 6:00:00 PM | ☐ | | |
| 9/1/2003 | Monday | 6:00:00 PM | ☐ | | |
| 8/18/2003 | Monday | 6:00:00 PM | ☐ | | |
| 8/4/2003 | Monday | 6:00:00 PM | ☐ | | |
| 7/21/2003 | Monday | 6:00:00 PM | ☐ | | |
| 7/7/2003 | Monday | 6:00:00 PM | ☐ | | |
| 6/16/2003 | Monday | 6:00:00 PM | ☐ | | ✓ |
| 6/2/2003 | Monday | 6:00:00 PM | ☐ | | |

[Save]

Figure 24

SYSTEM AND METHOD FOR AN EVENT PLANNER

CROSS-REFERENCE TO RELATED APPLICATIONS

The present application claims priority of U.S. Provisional Patent Application No. 60/390,797 filed Jun. 21, 2002, ENTITLED "LET's MEET" and is expressly incorporated herein by reference in its entirety.

TECHNICAL FIELD OF THE INVENTION

The present invention is in the field of computer based event planning, and more particularly, a web-based, passive, user-active, event-centric system and method for a group of people belonging to a club, which maintains and updates event information and member attribute.

BACKGROUND OF THE INVENTION

A traditional method of scheduling events is by sending out emails with the details of the event to all the members and waiting for response from each and every member before finalizing the event meeting time and place. The drawback on this type of scheduling system is that a lot of administration is involved in planning the event and sending out formal invitations. Also, the response from each member may be in different formats (for example: disparate operating systems, mail programs etc.) making it difficult to interpret and summarize the responses. Further, each member has limited knowledge about the effect of his inputs on the overall choice making process and there is no aggregated immediate feedback to a member about the event, the current state of the event and current status of other members.

Computer calendars and scheduler application software are widely used by members to plan events (meetings) and to check availability of other members. One function provided by some conventional calendar application is to allow each member to have access to the calendars of other members and view information about what other members have planned on certain days. This information pulled from other members may be helpful for scheduling events. One example of a conventional calendar application is LOTUS ORGANIZER, but there are many more applications with similar features. These applications rely upon each member to keep his/her calendar promptly updated to provide accurate status. The drawback of this application is that the calendar of each member might not be up-to-date or accurate and can result in scheduling conflicts. Further, the calendar of each member is to be maintained as a public document open for access by others within and outside the group to view and schedule, making it difficult for the member to maintain private schedules.

One other calendar and scheduler application is Novell, Inc.'s GROUPWISE that has endeavored to improve upon the appointment and scheduling process but has succeeded in creating complex proprietary system. The drawback with this approach is that it requires custom software or specialized hardware on every computer, and often operates within limited proscribed network environments.

Various other web-based scheduling tools are in use. One such system is proposed in U.S. Pat. No. 5,960,406 wherein a company-specific network database application is used to send out emails in various formats that automatically update the member's private calendar without permitting others from viewing the private calendar of the member. When the member does not have a private calendar of his own the system creates a new account with a private calendar. The newly created calendar would then be available to the system for automatic update when an event is scheduled. The drawback of this application is that the system is actively involved in communicating with members. The other drawback is that the system creates schedules for members. If members keep other private calendars or in other formats or in other locations, the member will soon have scheduling conflicts in his/her calendar. Yet another drawback is that members are automatically signed into an event and do not have the choice of accepting or rejecting participation in the event. Since the system automatically updates their calendar, they do not have the ability to view the list of members participating in the event.

Another application proposed under U.S. Pat. No. 6,457,045 creates an electronic form containing static and dynamic regions along with network addresses of members and sends it to the server. The server, in turn, forwards the electronic form to the members.

When the members open the email, the dynamic region of the form gets updated with the input from the member using interactive region. This dynamic region asynchronously updates the server with the member's information regarding participation in the scheduled event/meeting. The drawback of this invention among other things is that it does not provide a member visibility to the choices made by other members and the system is actively used in sending out the forms to the members and receiving their feedback.

The prior art in this field of invention falls far short of fulfilling a need for technology that provides more robust way of scheduling events in various computing environment using internet technology without having a member's calendar viewed and manipulated by others or installing software on each recipient's computer. It also falls far short of the ability for various members to view the list of other members participating in the event and the status of other members while making their own decisions for the event.

Also, the prior arts all required a lot of administration in planning an event. The systems were actively involved in managing events and member's involvement. The user had very little to no involvement in the whole planning process. Sometimes each member's actions depended on and affected other member's actions. A lot of communications were exchanged among members. One of the biggest drawbacks was that the information about the event and members were not available in real time.

SUMMARY OF THE INVENTION

It is an object of the invention to provide a system and method for providing access to a web site through an URL (Universal Resource Locator), which allows the members 30 to enter a web-based, passive, user-active, event-centric application and view or update information related to a club.

It is an additional object of the invention to provide an environment for a member 30 to independently access and view the details of the event and a list of other members 30 included for the event and to make a choice regarding participation in the event.

It is an additional object of the invention to provide an environment with multiple access levels so that a member 30 has access to the general area and the administrator 31 has access to additional areas and levels. The administrator 31 is a member 30 with additional responsibilities and capabilities.

It is an additional object of the invention to provide an environment for the members 30 to view their own attribute like profiles, status and role and to give them the ability to change their attribute for their own involvement in any event at any time.

It is an additional object of the invention to provide an environment where the administrator 31 has minimal responsibility in setting up the events for a club and the members 30 have the responsibility in the decision of involving themselves in the events.

It is an additional object of the invention to provide an environment where the system does not involve creating or maintaining members' 30 calendars, check or store members' 30 availability or send files, notifications or invitations to members 30.

To achieve the foregoing objectives, and in accordance with the invention as embodied and broadly described, a system and method for implementing a web site accessible to members 30 belonging to a particular club or group is provided. The method comprises displaying to members 30 information related to an event, attribute about the member 30 and attribute about other members 30 related to the event and allowing the member 30 to update the member's 30 own attribute and some information related to the event. An administrator 31 enters and updates information on the web site related to the club including the club information, information about the event and member's 30 attribute. Members 30, including administrators 31, access the web site using the provided URL and using their credentials (for example: username and password).

The system also provides the members 30 of the club means to update their own profile and modify the attribute for a particular event. Administrators 31 have the means to update the profiles of the members 30 of the club and the attribute of the events and schedule of events.

In this system, the administrators 31 have very few responsibilities in setting up information about the club and the members 30 have the responsibility and choice of getting involved in an event. There are no email invitations or electronic forms to send, as a result of which the responses need not have to be summarized, and the administrator 31 does not have to notify members 30. Members 30 go to the web site to get information about the club, the event and the list of members 30 involved in the club. The data is updated in real time (asynchronously) so the information viewed by the administrators 31 and members 30 is current.

The accompanying drawings, which are incorporated in and constitute a part of this specification, together with the description, serve to explain the invention in more detail.

DETAILED DESCRIPTION OF THE FIGURES

Figure 3:
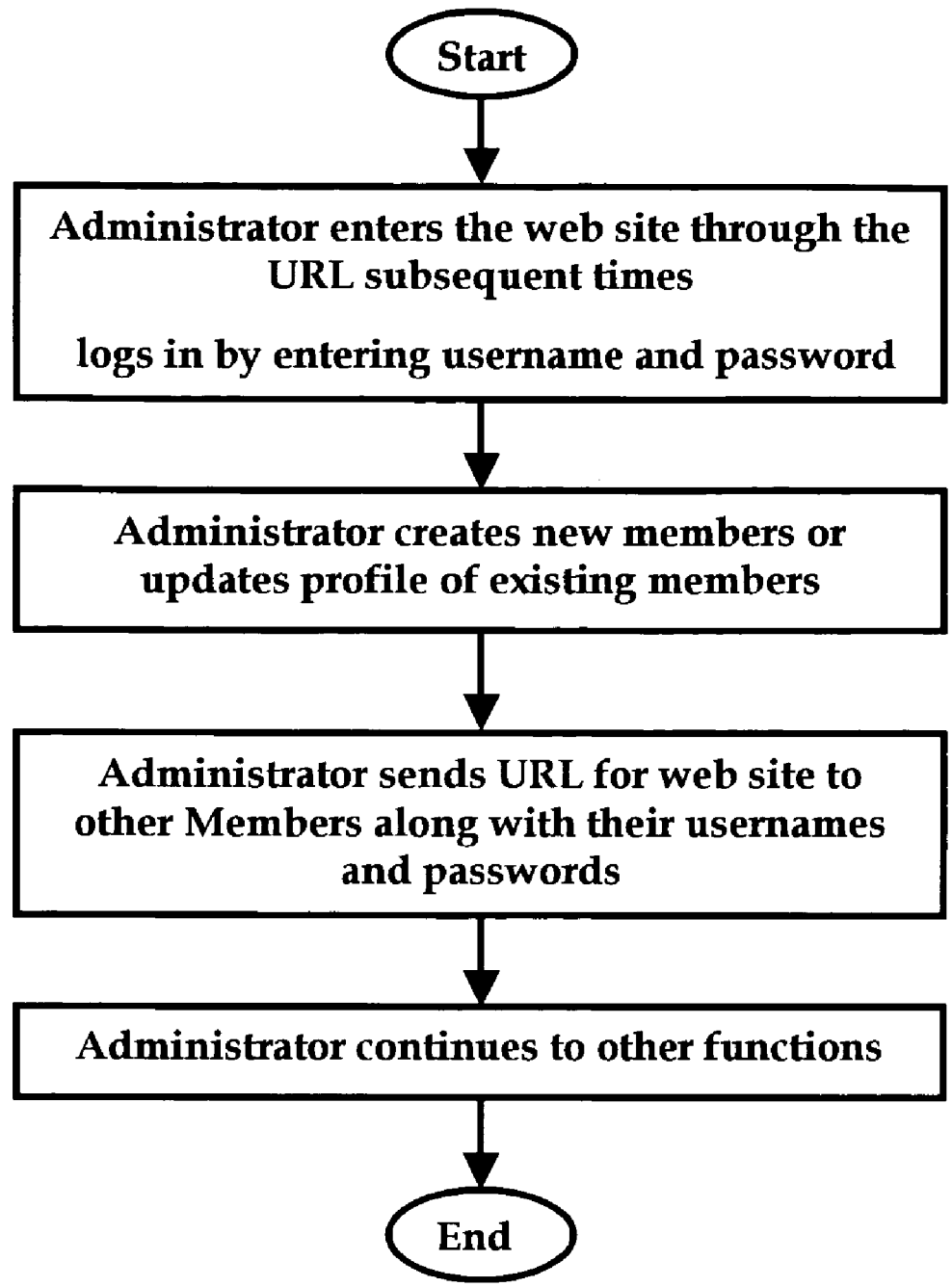

FIG. 3 is a flowchart illustrating the steps used by an administrator 31 to setup new members 30 and update existing members 30 profile.

Figure 4:
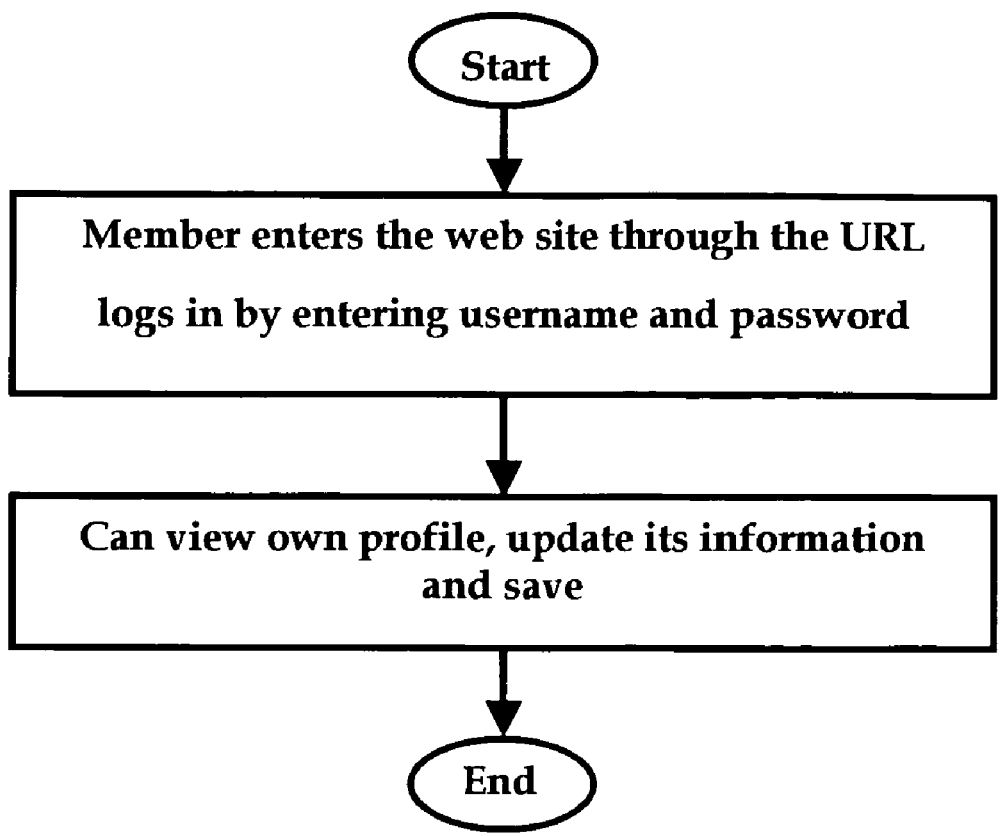

FIG. 4 is a flowchart illustrating the steps used by a member 30 to access and update member's 30 own profile for the event.

Figure 5:
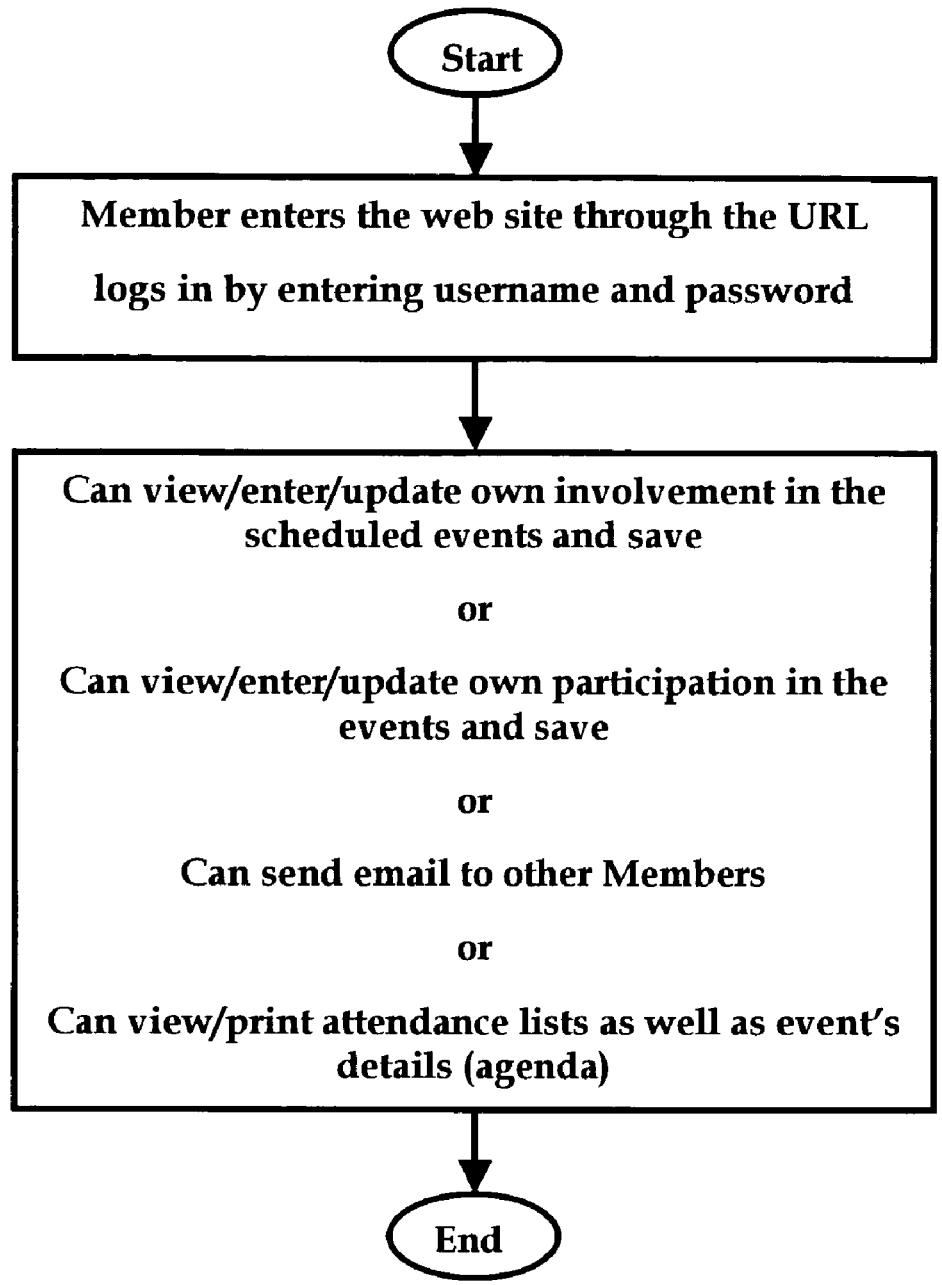

FIG. 5 is a flowchart illustrating the steps used by a member 30 to access and update member's 30 own involvement in the event.

Figure 6:
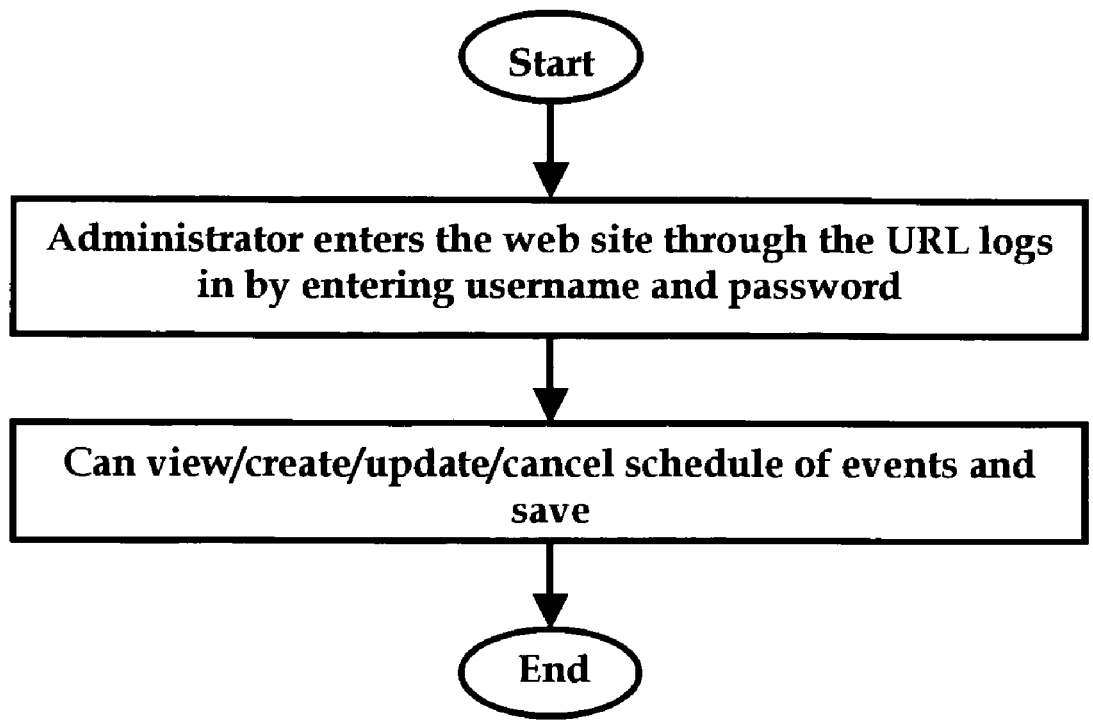

FIG. 6 is a flowchart illustrating the steps used by an administrator 31 to access and update the schedule of events.

Figure 7:
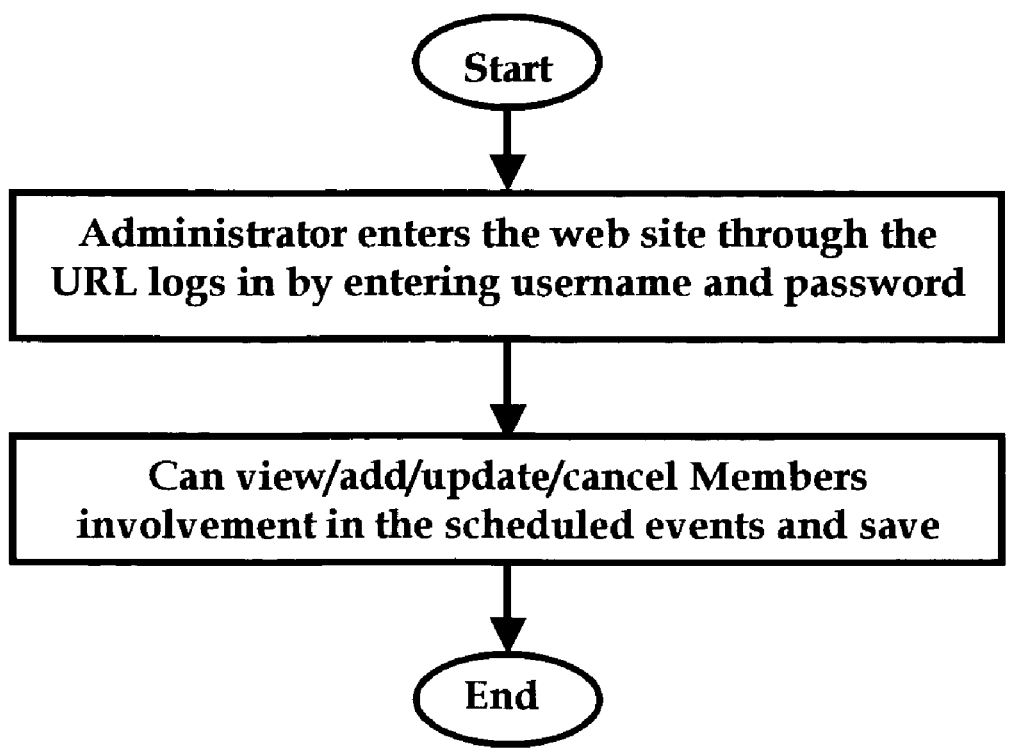

FIG. 7 is a flowchart illustrating the steps used by an administrator 31 to access and update member's 30 involvement in the event.

Figure 8:
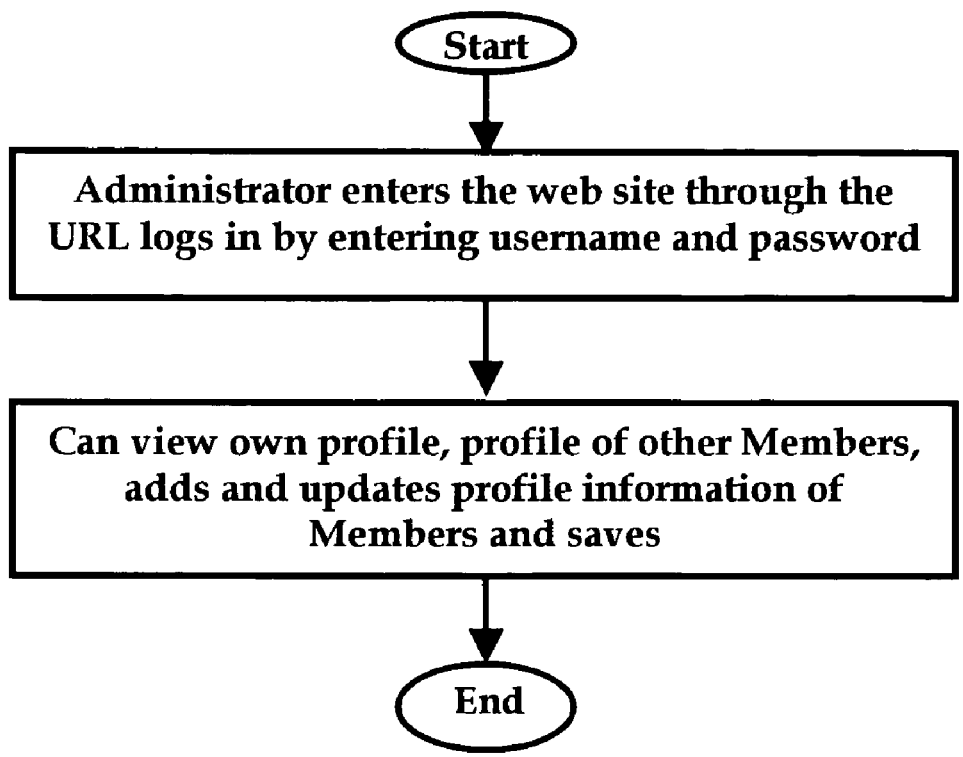

FIG. 8 is a flowchart illustrating the steps used by an administrator 31 to access and update profile of members 30 for the event.

Figure 9:
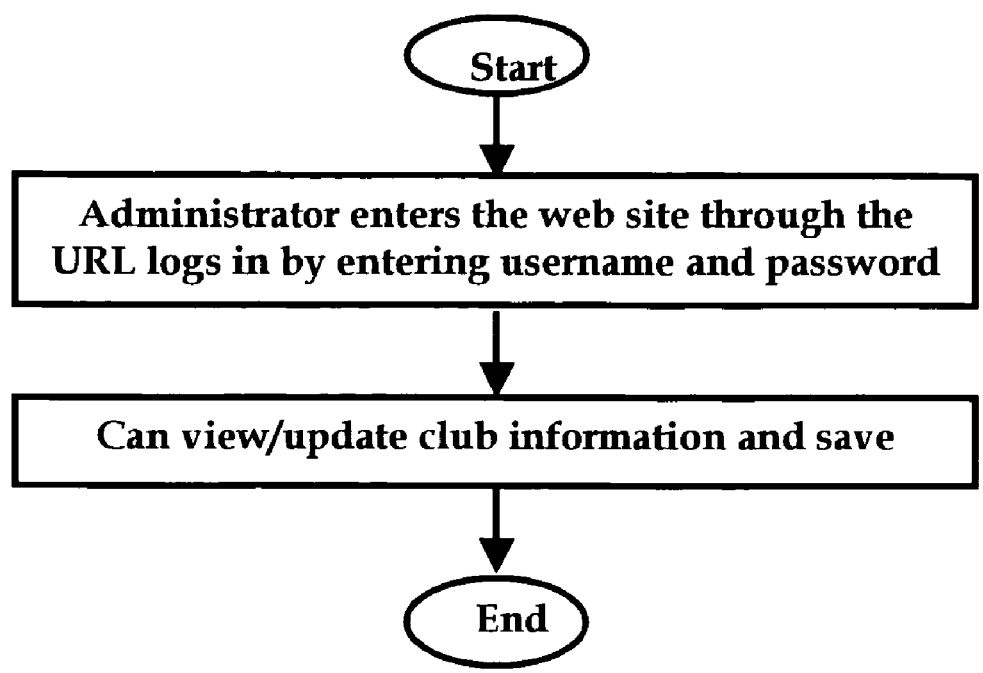

FIG. 9 is a flowchart illustrating the steps used by an administrator 31 to access and update club information.

FIG. 10 illustrates the login screen through which members 30 and administrators 31 of a particular club access the event and member 30 details within the web site, using their credentials.

FIGS. 11 through 16 illustrate the various screens available to the members 30. FIG. 11 illustrates the Main page with a general message about the club and schedule of events that the member 30 accesses after successfully logging into the web site.

FIG. 12 illustrates a screen with the details of a specific schedule of an event and list of attendees for the particular event accessed by the member 30 when the Details button is selected on the Main page for a scheduled event.

FIG. 13 illustrates the Agenda screen (event information) when the Print Agenda button is selected on FIG. 12.

FIG. 14 illustrates the Attendance List screen when the Print Attendance button is selected on FIG. 12.

FIG. 15 illustrates the Club Info screen when member 30 selects the Club Info button on the Main page from the Menu. The Menu is a set of buttons or similar user interface mechanisms to receive user responses that are available to members 30 and the administrators 31 to access the various screens.

FIG. 16 illustrates the Member Profile screen when members 30 select the Member Profile button on the Menu.

FIG. 17 illustrates the Club Info screen accessed by an administrator 31 when the administrator 31 logs into the web site for the first time.

FIG. 18 illustrates the Main page accessed by an administrator 31 on subsequent logins. This screen displays the general message under the club information on the left and schedule of meetings on the right.

FIG. 19, similar to FIG. 12, illustrates a screen with the details of a specific event and list of members 30 for the particular event, accessed by the member 30 when the Details button is selected on the Main page for a scheduled event. An administrator 31 has the ability to assign a function to a member 30 in the event and specify if a member 30 is attending the event or not. If a function is assigned to a member 30, the participation for that member 30 is automatically marked as "Yes".

FIG. 20 illustrates the Club Info screen accessed by an administrator 31 when the Club Info button is selected on the Menu. The administrator 31 can update all information on the club and save it.

FIG. 21 illustrates the Add New Member screen when an administrator 31 selects the Member Profile button on the Menu. The administrator 31 can update information on an existing member 30 or add a new member 30 to the club.

FIG. 22 illustrates the Edit Member Profile screen when an administrator 31 selects the Edit button the Member Profile screen (as illustrated in FIG. 21). The administrator 31 can update the member attribute for any member 30 and save it.

FIG. 23 illustrates the Schedule Meeting Times screen when an administrator 31 selects the Create Schedule button on the Menu. The administrator 31 can create schedule of events in different ways.

FIG. 24 illustrates the Edit Schedule Detail screen when an administrator 31 selects the Edit Schedule button on the Menu. The administrator 31 can change the date or the time of a meeting or cancel a meeting.

DETAILED DESCRIPTION OF THE PRESENT INVENTION

The present invention is an event planner comprising an event database 11 wherein the event database 11 provides information regarding the event to a selected audience or club. The information in the event database 11 comprises the schedule, location and agenda of the event. The information in the event database 11 also comprises names of members 30 of the selected audience who accept, deny or have not responded to the event and all members 30 of the selected audience can view the names of the members 30 who accept, deny, or have not responded to the event in the event database 11. In addition to the event information, the event database 11 also comprises other related information about the selected audience. The event database 11 is accessed by the selected audience using the World Wide Web (the Internet 20) and access is validated by using password protection.

In general, the present invention is a web-based, passive, user-active, event-centric method and system for planning an event. The planning of an event includes creating, accessing and maintaining of an information center for schedule of events for a club or group. A preferred embodiment is explained in greater details in the following paragraphs but is illustrative and is not intended to be limiting the invention in any way.

The method uses a web server 10, consisting of a database 11 and a web application 12. Multiple members 30 with one or more being administrators 31 are connected to the web site on the web server 10 through the Internet 20. The data is stored in an event database 11 through a database engine.

Figure 1:
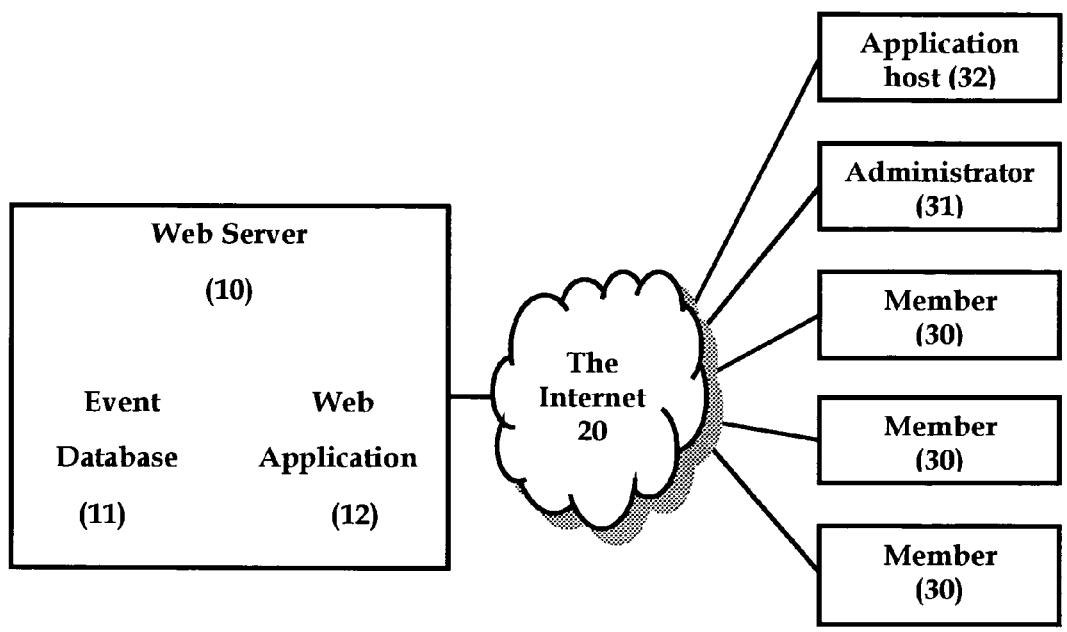
FIG. 1 is a block diagram illustrating a system with access to the World Wide Web.

FIG. 1 illustrates a system for implementing the invention. The system of FIG. 1 connects plurality of members 30, administrators 31, and an application host 32 to a Web server 10 through the Internet 20. The web server 10 is connected to the Internet 20 through a Wide Area Network (WAN) by one of the following means: T1 line, DSL (Digital Subscriber Line), Cable Modem and phone modems. The Web server 10 enables hosting the web site and running the web application. Members 30 access the web site through any device capable of accessing the web site. The device includes a personal computer, a phone or any other device, which allows a member 30 to access and update information on the web site. The Web server 10 includes a server or a multiple server computer system configured to appear as a single resource. An event database 11 created through the database engine holds data for the clubs, events, and members 30. A Web application 12 is part of the Web server 10. The Web server 10 could be a commercially available web server, such as Microsoft's IIS or Apache. The web application 12 facilitates the member interface to the event database 11 using an Internet or Web browser. The event database 11 receives query and update requests from web application 12, initiated by members 30 and administrators 31. The updates are performed asynchronously relative to the members' 30 inquiry and input so that the information in the event database 11 is always current.

In one embodiment, this invention provides access to the web site to two types of role users. The first is the administrator 31 and the second is the member 30. An administrator 31 has access to additional functions and levels than a member 30. The administrator 31 views and updates the club information, adds members 30 to the club, creates schedule for events, views & updates event information and member attribute. The administrator 31 also has the ability to cancel a schedule of an event and/or members' 30 membership in the club. The members 30 have the ability to view and update their own profile, and their own involvement and participation in the scheduled events. Additional role users could include an officer and/or a guest. An officer has more capabilities to update the information in the event database than a member, but less than that of an administrator. A guest can view information about the events of the event database but has no capability to change the information in the event database.

An administrator 31 initially enters an URL (Universal Resource Locator) to access the web application 12 over the Internet 20. The Internet 20 connects (by any means such as a T1 line, DSL, Cable Modem, or phone modems) the members' 30 and administrators' 31 device to the web site on the Web server 10. The web site prompts for the credentials (for example: username and password) and upon validating the credentials, the application displays the up-to-date information related to the club from the event database 11, the member attribute associated with each of the members 30 in addition to the information for the event. The means to display information from the event database 11 including the event information, club information, member attribute is the use of a computer monitor or other similar display devices.

The various steps involved in setting up the club information, event information, and member attribute are explained in the following paragraphs in detail.

The initial step that an administrator 31 takes is to update information of a club. The application host 32 creates the club profile with minimal information (for example: club name) and at least one administrator account with a username and a password, in conjunction with the club, and provides the URL to the administrator 31 to access the club. An application host 32 can create a plurality of clubs and at least one administrator 31 for each of the clubs. An administrator 31 is a member with additional roles and responsibilities for a given club. The role of an administrator 31 in setting up the club information is illustrated in flowchart of FIG. 2. An administrator 31 logs in through the URL provided by the application host 32 to access his/her club by entering a username and a password on a computer or the like with internet connections using input devices like a keyboard. Request is submitted to the web server 10, through the web application 12. The username and password are checked against the data in the database to validate the login and to provide access to the administrator 31 to get the appropriate club information. The administrator 31 is provided with a plurality of interactive screens to view, update and add information related to the club. The administrator 31 accesses the web site for the club through a login screen, as shown in FIG. 10. Username and a password combinations are unique across all clubs.

Figure 2:
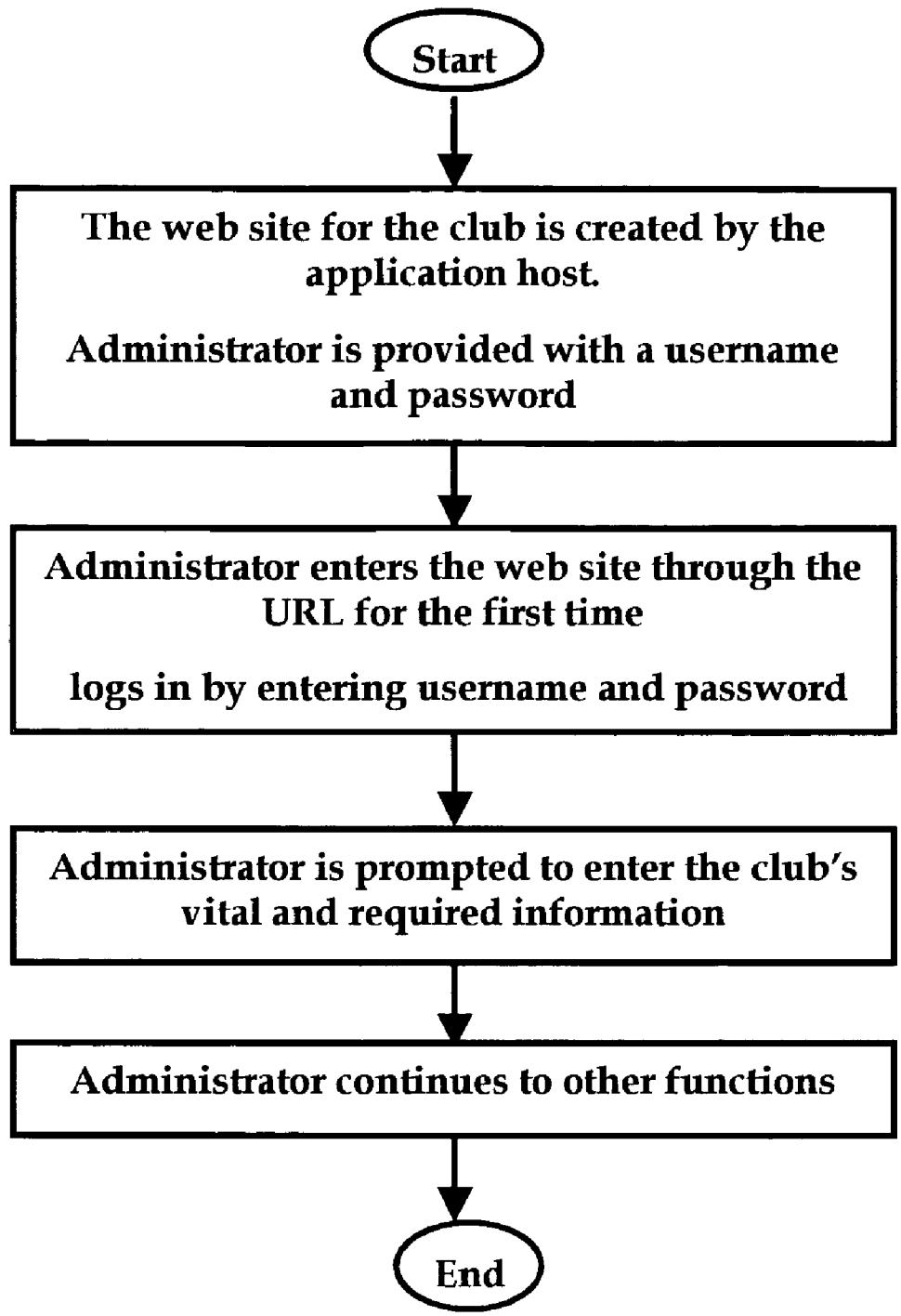
FIG. 2 is a flowchart illustrating the steps used by an administrator 31 to setup the club.

When an administrator 31 logs successfully into the web site for the club for the first time, the appropriate Club Info screen (to which he/she belongs with that username and password) appears as illustrated in FIG. 17. The flowchart for the steps taken by the administrator 31 to enter the club information is as shown in FIG. 2. The administrator 31 has to enter all the required information about the club on the Club Info screen before he/she can continue. The data input on this screen identifies the club and is updated to the event database 11 through a database engine when the screen is saved by selecting the save button. The club attribute in this embodiment, for example, in addition to the club number, include Area, Division, District, Name, Meeting Time, Meeting Frequency, Meeting Location, Meeting Address, Meeting Attire, and other information relevant to the club. Using this, the administrator 31 creates the schedule for the event by selecting the Create schedule button that is explained in greater detail below.

After the club information has been entered on the Club Info screen, as previously described, upon subsequent logins by the administrator 31, the Main page as illustrated in FIG. 18 is displayed. This page displays the general message under club information on the left and schedule of meetings on the right. The options available to the administrator 31 appear as buttons or similar user interface mechanisms to receive user responses, in a convenient location on the page (for example: on the top of the screen as buttons, in this present embodiment) and are illustrated in FIG. 18. The buttons available to the administrator 31 or the member 30 on the Main page constitute the Menu. The Menu options available to the administrator 31 are Club Info, Member Profiles, Create Schedule, Edit Schedule and Main. The administrator 31 accesses the various screens by using the appropriate button from the Menu.

When an administrator 31 selects the Club Info button on the Menu, all the information of the club stored in the database (that the administrator 31 entered when he/she initially logged into the club web site) displays as illustrated in FIG. 20. The administrator 31 can update all information on the club and save it. The steps taken by the administrator 31 to update the club information is illustrated in FIG. 9. When the screen is saved, club information fields in the event database 11 is updated.

The administrator 31 enters the member information selecting the Member Profile button on the Menu. The administrator 31 has the option of adding a new member 30, editing an existing member 30 or canceling an existing member's 30 membership.

When the administrator 31 first selects the Member Profile button on the Menu, the Add New Member screen displays as illustrated in FIG. 21. The administrator 31 enters the information for required and optional fields for the new member 30 on this screen. The flowchart for the steps taken by the administrator 31 to add new members is as shown in FIG. 3. When the screen is saved, the member information in the event database 11 is updated. The new member's 30 username and password can then be mailed by email to the new member 30 by selecting the Send Username & Password To This Member button. The unique username and password that a member 30 uses to log into the web site ties the member 30 to the corresponding club by using a plurality of primary and foreign keys. The member 30 is associated with a set of member attribute. The member attribute in this embodiment, for example, include Username, Password, Salutation, First Name, Middle Initial, Last Name, Title, Position, Email Address, Member Cancel Flag, Attendance Status for the related event and one or more telephone number—Home, Work and Cell phone number.

The administrator 31 can modify the profile of existing members 30 of the club by selecting the Edit button for a specific member 30 on the Member Profile screen (as illustrated in FIG. 21). The flowchart for the steps taken by the administrator 31 to update profile of members is as shown in FIG. 8. The Edit Member Profile screen displays as illustrated in FIG. 22. The administrator 31 updates the specific member's 30 attribute and saves it. The save option updates the member 30 information in the event database 11. If the administrator 31 changes the username and/or password, he/she can select the Send Username & Password To This Member button to send an email to that member 30. This email includes the URL to the web site and member's 30 username and password.

In order to cancel an existing member's 30 membership in the club, the administrator 31 accesses the screen illustrated in FIG. 22 by selecting the Edit button for that member 30 in the Member Profile screen (as illustrated in FIG. 21). The flow chart for the steps taken by the administrator 31 to cancel the member's 30 membership is as shown in FIG. 8. When a member's 30 membership to the club is to be canceled, the cancel checkbox is checked. When the screen is saved, the data is updated in the event database 11. Cancel checkbox is available to the administrator 31.

An administrator 31 can select the Details button on the Main page for a specific schedule to access the event details as illustrated in FIG. 19. Initially, this screen will be empty. On the left, the administrator 31 can assign a function to a member 30 in that event in which case that member 30 automatically will be marked with a "Yes" for attendance to the event. The flowchart of steps taken by the administrator 31 to view, add, update and cancel member's 30 involvement in the scheduled event is as shown in FIG. 7. The event in this embodiment, for example, is a meeting and the function relates to presentation in the meeting, presentation evaluation, meeting evaluation, being a toastmaster for the evening, table topics mastering for the evening, general evaluation etc. The event attribute includes a list of participating members 30, the Name of the Presentation, Name of the Presenter, Presentation Evaluator, General Evaluator for the Evening, Toastmaster for the Evening, Table Topics Master for the evening, Event Cancel Flag, Event Cancel Date and comments to enter any other special instructions for the event. The administrator 31 can send email to an individual member 30 by selecting the email link for that member 30 or to all members 30 by selecting the "Send Email to all Members" button. When the screen is saved, the appropriate fields in the event database 11 is updated asynchronously.

The administrator 31 creates a schedule for the event by selecting the Create Schedule button on the Menu. When the Create Schedule button is selected the Schedule Meeting Times screen as illustrated by FIG. 23 is displayed. The flow chart for the steps taken by the administrator 31 to create the schedule is as shown in FIG. 6. The administrator 31 can update all the fields in this screen and can create schedule of events. The event database 11 will be updated when this screen is saved. The application gives the administrator 31 multiple ways to schedule an event by specifying a date or a day or periodical frequency. The event attribute in this embodiment, for example, include a Frequency of the event (for example: weekly, monthly, biweekly, bimonthly etc.), Day of the Week, Day of the Month, the Start Time, and the Duration of the event as illustrated in FIG. 23.

The administrator 31 also has the option of updating or canceling the existing schedule of an event by selecting the Edit Schedule button on the Menu. The Edit schedule screen, as illustrated in FIG. 24, displays the list of schedule for the specific event from the event database 11 that members 30 are associated with and gives the option to the administrator 31 to edit some of the fields or cancel a specific schedule. The flowchart for the steps taken by the administrator 31 to update the schedule of events is as shown in FIG. 6. When the administrator 31 selects a specific schedule to cancel, he/she checks the appropriate checkbox. The event database 11 is updated when the screen is saved and the system saves the current date as the date the schedule was cancelled.

Once the information is set up for the club on the web site, a member 30 can login to the web site using the login screen as shown in FIG. 10. Based on the username and the password provided by the member 30 the Main page for the corresponding Club is displayed. The Main page displays the general message under the club information on the left along with a list of scheduled event on the right, as shown in FIG. 11. The options available to the member 30 are displayed as buttons or similar user interface mechanisms to receive user responses, in a convenient location on the page (for example: on the top of the screen as buttons, in the present embodiment). The buttons available to the member 30 are Club Info, Member Profiles, and Main.

When a member 30 selects the "Details" button corresponding to a specific event on the Main page, the details of that specific event (agenda) along with the attendance list for that specific event are displayed to the member 30 as illustrated in FIG. 12. The member 30 has the option of specifying how he/she wants to contribute to the event and how he/she wants to participate. The flowchart for the steps taken by the member 30 to update the member's 30 involvement is as shown in FIG. 5. The member 30 can contribute, for example, by volunteering to give a speech or by choosing to be an evaluator for another member's 30 speech. The member 30 can also choose his/her own status of attendance for the event in one of two ways—i) By basing on the list of other members' 30 participation and contribution to the event or ii) Irrespective of the list of other members' 30 decisions to participate and contribute to the event. The values that the attendance status can take, in this embodiment, for example, are "Will Attend", "Will Not Attend" and "Is Undecided". The member 30 makes his/her choice of participating in a particular event by selecting one of the 3radio buttons or similar user interface mechanisms to receive user responses—Will attend, Will Not attend, Is Undecided. The event database 11 is updated when the screen is saved. In this system and method, the member 30 has the responsibility to initiate participating in the event.

When a member 30 selects the Club Info button on the Menu, the details of the club is displayed as illustrated in FIG. 15. This is just a display screen and the member 30 does not have the ability to update any of the fields on this screen.

When a member 30 selects the Member Profile button on the Menu, the member 30 can view and update his/her own Profile on the Profile screen as illustrated by FIG. 16, and save it. The flowchart for the steps taken by the member 30 to update his/her own profile is as shown in FIG. 4. When the screen is saved, the data is updated in the event database 11.

In addition to the member attribute and event information, the web site also provides the member 30 buttons or similar user interface mechanisms to receive user responses, to print the details/agenda and the attendance list for an event. The details/agenda of the event depicts the details as shown in FIG. 13. The attendance list for a specific schedule of the event is depicted in FIG. 14.

In addition to the types of users previously described, additional user types can be created, by giving different levels of access. For example, other role users that can access the web site could be an officer or a guest. The guest can have access to the login screen where they can choose to sign in as a guest. Upon login they view a list of clubs accessible to the guest. The guest selects a club and they are presented with the Event details screen or the Agenda, where the guest can view the details of the event and the list of schedules for the event. The guest does not have access to any other information on the event database 11.

Similarly, an officer can be a member with additional responsibilities and capabilities than a member 30 but fewer responsibilities and capabilities than an administrator 31.

The roles and responsibilities of members 30 and administrators 31 in the club are clearly defined. The administrator 31 has the initial role of setting up information about the club, events for the club, schedule for each and every event and members 30. The administrator 31 also has the ability to designate other members 30 as administrators 31. Additionally, the administrator 31 has the ability to update information pertaining to the club, update schedule of events or event attribute for a specific event or cancel specific schedule of an event, cancel members' 30 membership in the club, add new members 30 and update any existing members' 30 profile. The administrator 31 does not monitor members' 30 participation, their contribution, or their availability. It is left to the individual members 30 to access the web site and choose to participate/contribute or to not participate/contribute to the event. Within the web site, the member 30 has the ability to view his/her own profile, list of selective attribute of other members 30 of the club and update his/her profile and attribute related to the event and save. In addition, the member 30 is able to view the event details or agenda and club information.

The present invention provides very little amount of administration in setting up the information for the club and members for the club while it provides the members 30 greater visibility to the list of all members 30 for any event along with the current status of their participation and gives the members 30 the ability to make their own decisions.

The system, in the present invention, is passive in a way that it provides a medium in which a number of people come together to form a group or club. It does not manage events, send invitations to the members 30, send notifications to the members 30, expect reply or acknowledgement from its members 30 and hence summarize the members' 30 responses, check or store members' 30 availability, provide or keep public or private calendars for members 30, or send files or forms to members 30.

The system of the present invention is User-active and lets the individual members 30 take the responsibility of signing into the web-site and checking the scheduled events and decide on their participation/contribution.

It is event-centric since the web-site revolves around events, schedule of events, members 30 related to events and members' 30 participation and contribution to the events.

While the present invention was described with respect to a particular embodiment, other embodiments, uses and advantages of the present invention will be apparent to those skilled in the art. The specifications and examples should be considered as exemplary.

What is claimed is:

1. A system for web-based, passive, user-active, event-centric application comprising:
   a database and an application on a web server,
   wherein the database is a repository of information on a) a club, b) an event for the club, c) a member attribute for a member of the club, wherein the event is managed by the member;
   means for accessing the information on the event, the access being limited to the member; and
   means for updating the information on the event by the member;

wherein the passive, user-active, event-centric application not involving monitoring the information for the event;

the system being passive since it provides a medium in which a number of people come together to form a group or club, it does not manage events, it does not send invitations to the members, it does not send notifications to the members, it does not expect reply or acknowledgement from its members and hence it does not summarize the members' responses, it does not check or store members' availability, it does not provide or keep public or private calendars for members, or it does not send files or forms to members;

the system being user-active since individual members must take the responsibility of signing into the web site and checking the scheduled events and decide on their participation/contribution; and the system being event-centric since the web site revolves around events, schedule of events, members related to events and members' participation and contribution to the events.

2. The system of claim 1, wherein the means for accessing the information for the event is by a user interface, the user interface providing the member access to a) retrieve the information for the event, b) add new information for the event, and c) update the information for the event.

3. The system of claim 2, wherein the means for accessing the information for the event is by entering a username and password on a password protected interactive screen, the interactive screen accessible by the member.

4. The system of claim 1, wherein the means for accessing the information for the event further comprising means for displaying to the member a) the information for the event, b) a selective attribute associated with the member and c) the selective attribute associated with the other members other than the member; and means for updating the selective attribute for the member.

5. A method for web-based, passive, user-active, event-centric application comprising:

creating a database on a web server wherein the database is a repository of information on a) a club, b) an event for the club, and c) a member attribute for a member of the club, wherein the event is managed by the member;

accessing the information on the event, wherein the access is limited to the member; and updating the information on the event by the member;

wherein the passive, user-active, event-centric application not involving monitoring the information for the event;

the application being passive since it provides a medium in which a number of people come together to form a group or club, it does not manage events, it does not send invitations to the members, it does not send notifications to the members, it does not expect reply or acknowledgement from its members and hence it does not summarize the members' responses, it does not check or store members' availability, it does not provide or keep public or private calendars for members, or it does not send files or forms to members;

the application being user-active since individual members must take the responsibility of signing into the web site and checking the scheduled events and decide on their participation/contribution; and the application being event-centric since the web site revolves around events, schedule of events, members related to events and members' participation and contribution to the events.

6. The method of claim 5, further comprising printing (a) the information for the event and (b) the member attribute.

7. The method of claim 5, wherein accessing the information on the event is by a user interface, the user interface providing the member access to a) retrieve the information for the event, b) add new information for the event, and c) update the information for the event.

8. The method of claim 7, wherein providing the member access is by a password protected interactive screen, the interactive screen accessible by the member.

9. The method of claim 5, further comprising setting up the club, the setting up comprising adding attribute for the club and creating an administrator, the setting up of the club performed by an application host.

10. The method of claim 9, wherein the administrator performs a) setting up access to the database, b) updating the information for the club, c) creating an event for the club, d) creating a schedule for the event, e) updating the information for the event, f) canceling the schedule for the event, g) adding the member attribute for a new member, and h) updating the member attribute for the event.

11. The method of claim 10, wherein updating the member attribute comprises a) adding a member contribution to the event, b) updating the member contribution to the event, c) canceling the member contribution to the event, d) adding a member participation to the event, e) updating the member participation to the event, f) canceling the member participation to the event, g) updating the member attribute for the member and h) canceling the membership of the member to the club, the adding, updating and canceling limited to the administrator.

12. The method of claim 5, wherein the member is a particular member, the particular member performs a) adding the particular member contribution to the event, b) updating the particular member contribution to the event, c) canceling the particular member contribution to the event, d) adding the particular member participation to the event, e) updating the particular member participation to the event, f) canceling the particular member participation to the event and g) updating the particular member attribute.

13. The method of claim 5, wherein the club information, the event information and the member attribute are linked by a primary key and a foreign key.

14. The method of claim 5, wherein the information for the club comprises a Name, a Club Number, an Area, a Division, a District, a Meeting Time, a Meeting Frequency, a Meeting Location, a Meeting Address and a Meeting Attire.

15. The method of claim 5, wherein the information for the event comprises a Frequency of the event, an Event Day, a Day of the Month, an Event Date, an Event Time, an Event Start Time, an Event Duration, an Event Location, a List of Members invited to the event, a List of Presenters, an Event Host, an Event Evaluator, a Name of Presentation, a Presentation Evaluator, an Event Cancel Flag, an Event Cancel Date and a Comment.

16. The method of claim 5, wherein the member attribute for the member comprises a Salutation, a First Name, a Last Name, a Middle Initial, a Title, a Position, a Home Telephone Number, a Work Telephone Number, a Cell Phone Number, an Email Address, a Member Cancel Flag, an Attendance Status, an Username and a Password.

17. The method of claim 5, wherein providing access further comprising displaying to the member a) information related to the event, b) a selective attribute associated with the member related to the event and c) the selective attribute associated with one or more members other than the member related to the event; and updating one or more of the selective attribute for the member in the database; wherein the selective attribute associated with the member contribution and participation in the event.

18. The method of claim 17, wherein the selective attribute associated with the member comprises a First Name, a Last Name, a Middle Initial, an Attendance Status and an Email Address.

* * * * *